United States Patent [19]

Fowles

[11] Patent Number: 5,004,181

[45] Date of Patent: Apr. 2, 1991

[54] CORDLESS ELECTRIC FISHING REEL

[76] Inventor: Arthur D. Fowles, 14526 SW. 42 Ave. Rd., Ocala, Fla. 32673

[21] Appl. No.: 427,774

[22] Filed: Oct. 27, 1989

[51] Int. Cl.$^5$ ............................................. A01K 89/00
[52] U.S. Cl. ................................... 242/225; 242/257; 43/26.100
[58] Field of Search ................ 43/26.1; 242/257, 225, 242/250, 323, 47, 100, 263, 256

[56] References Cited

U.S. PATENT DOCUMENTS

| | | | |
|---|---|---|---|
| 2,314,032 | 3/1943 | Coxe et al. | 242/257 X |
| 3,116,892 | 1/1964 | Pichard | 242/250 |
| 3,248,819 | 3/1966 | Stealy | 242/225 |
| 3,252,239 | 5/1966 | Moeller | 242/225 X |
| 3,411,230 | 11/1968 | Hopper | 242/225 |
| 3,463,415 | 8/1969 | Lingle | 242/225 |
| 3,841,605 | 10/1974 | Joraku et al. | 254/127 |
| 3,922,808 | 12/1975 | Rieth | 242/106 |
| 3,932,954 | 1/1976 | Wyroski | 242/225 |
| 4,253,165 | 2/1981 | Christiansen | 367/96 |
| 4,344,587 | 8/1982 | Hildreth | 242/106 |
| 4,378,652 | 4/1983 | Lindgren | 242/250 |

FOREIGN PATENT DOCUMENTS

| | | | |
|---|---|---|---|
| 492120 | 9/1938 | United Kingdom | 242/250 |
| 618743 | 2/1949 | United Kingdom | 242/257 |

Primary Examiner—William A. Cuchlinski, Jr.
Assistant Examiner—Joseph A. Rhoa
Attorney, Agent, or Firm—Leon Gilden

[57] ABSTRACT

A cordless electric fishing reel is set forth wherein a conventional fishing pole includes an elongate, hollow handle mounted rearwardly of a fixedly secured fishing reel. The handle includes a self-contained battery pack aligned with an electric motor wherein the electric motor is cooperative with plural sets of planetary gears wich an output shaft of the planetary gear arrangement directed and aligned with a ratchet mechanism. The ratchet mechanism is operative for engagement interiorly of a ratchet sleeve to engage and drive the associated reel for rewinding of the fishing line associated with the reel. A pivotally mounted switch mounted on the handle is formed with a medial bore for receiving in a non-binding manner the output of the planetary gear arrangement with an electrical contact arrangement positioned at a lowermost end of the switch for selectively energizing the motor.

3 Claims, 5 Drawing Sheets

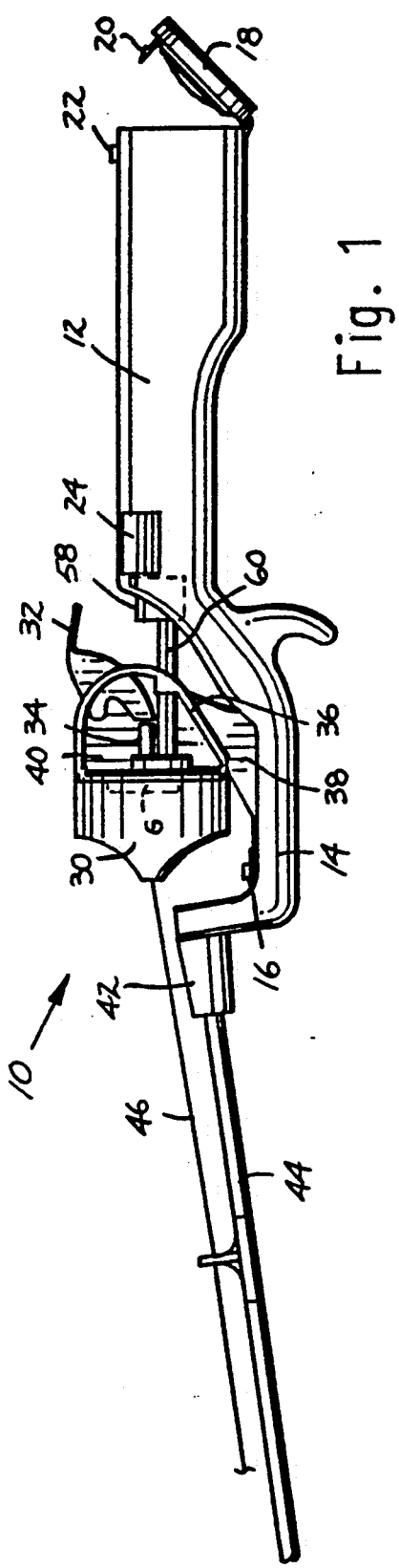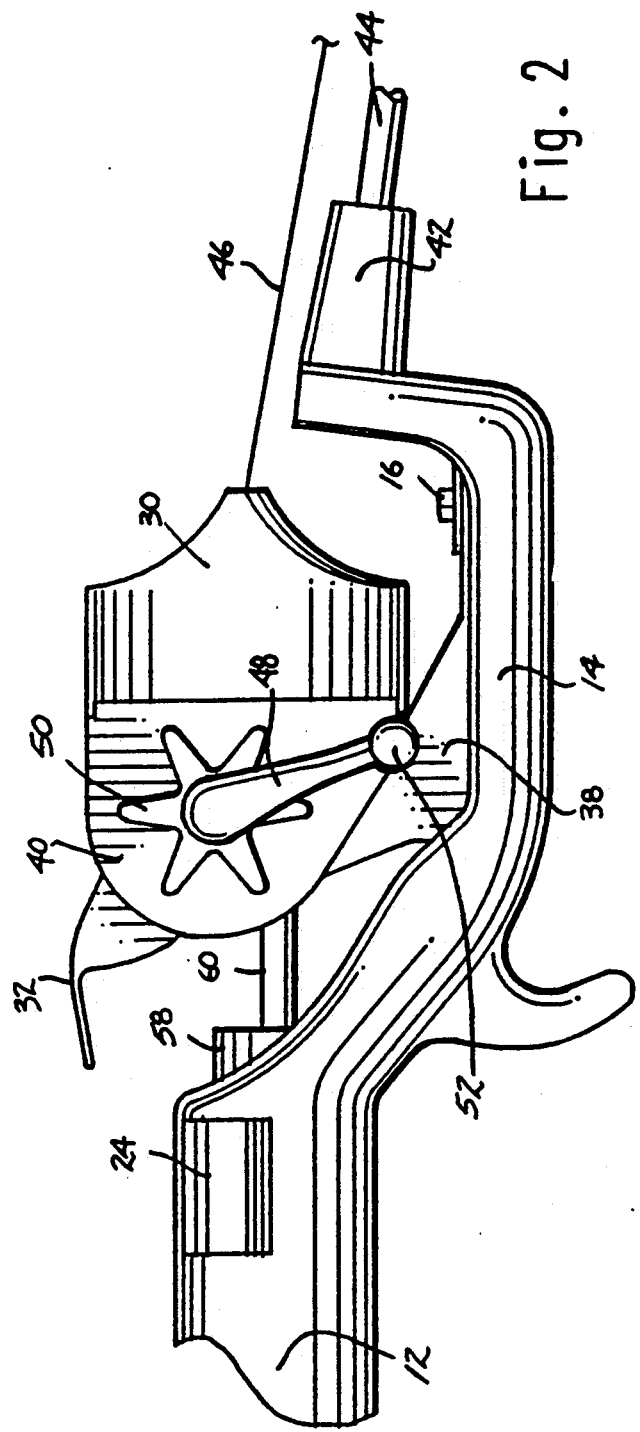

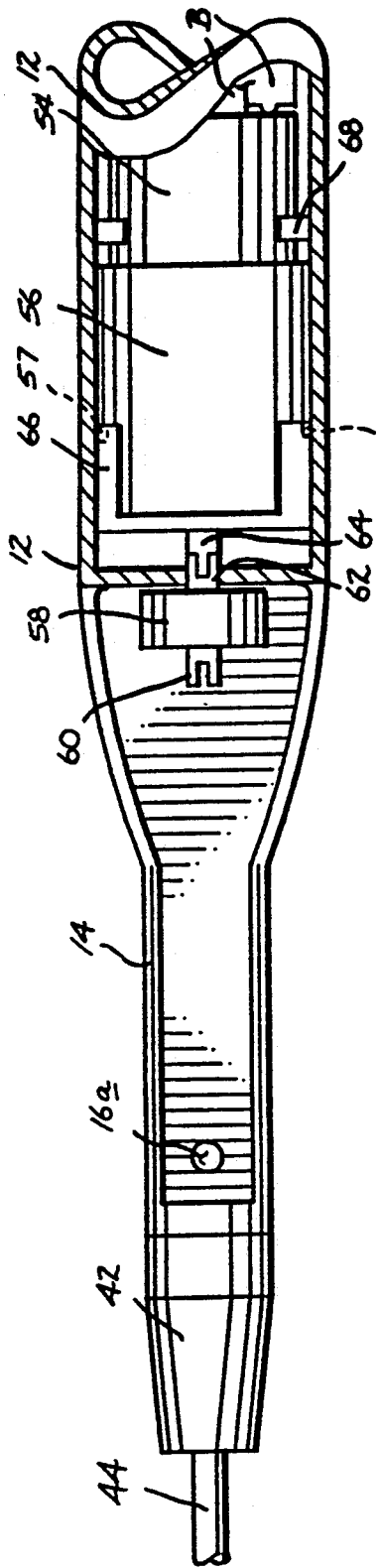
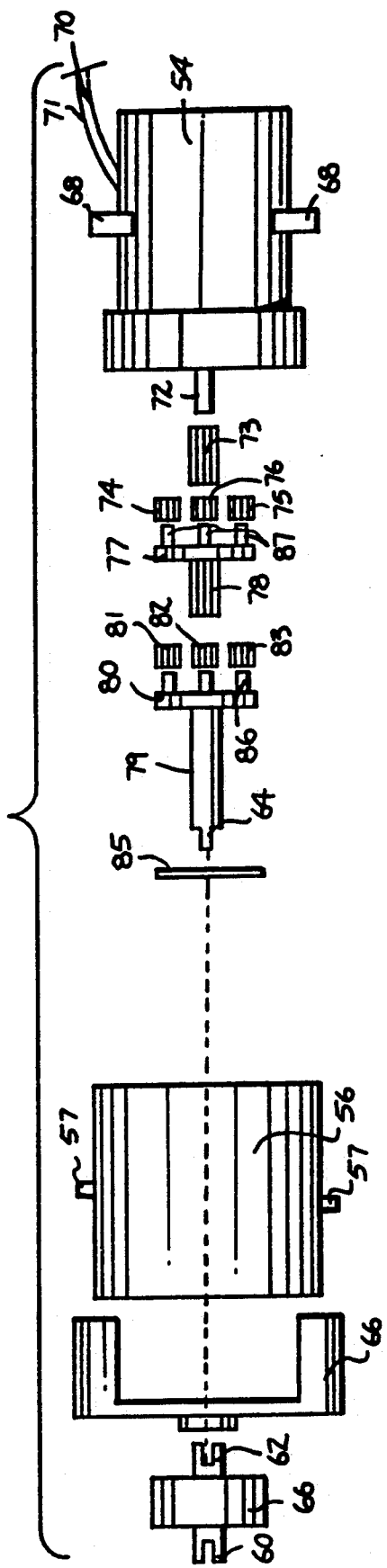
Fig. 3
Fig. 4

CORDLESS ELECTRIC FISHING REEL

BACKGROUND OF THE INVENTION

1. Field of the Invention

The field of invention relates to motorized reel organizations, and more particularly pertains to a new and improved cordless electric reel selectively actuated for rewinding of an associated reel of a rod and reel organization.

2. Description of the Prior Art

The prior art has utilized motorized reels for assisting the rewinding of fishing line during a fishing procedure. The instant invention attempts to overcome deficiencies of the prior art by providing an improved mechanism for directing actuation of the reel wherein a ratchet and coupling arrangement arranged between a plural planetary gear set to effect enhanced mechanical advantage directed to the reel, wherein the energy is directed through an associated ratcheting arrangement. Examples of the prior art include U.S. Pat. No. 4,253,165 to Christiansen wherein an electrically controlled device is provided with digital indication of fishing line depth by counting revolutions of a winding and reel spool of the machine.

U.S. Pat. No. 4,344,587 to Hilderth sets forth a motorized fishing reel provided with a frame and a belt drive to selectively actuate the reel for selective winding and unwinding of the reel.

U.S. Pat. No. 4,378,652 to Lindgren sets forth a motorized fishing reel with control means to enable rewinding of the reel upon a fish strike.

U.S. Pat. No. 3,922,808 to Rieth sets forth a trolling reel for raising and lowering a fishing line with a reversible drive motor coupled with the control means for automatic positioning of the end of the control line as desired from a lake bottom or a predetermined depth.

U.S. Pat. No. 3,841,605 to Joraku sets forth a load moving apparatus with a torque control circuit wherein the operation of speed control unit is stopped when the torque control circuit contains a predetermined value.

As such, it may be appreciated that there is a continuing need for a new and improved cordless electric fishing reel wherein the same is arranged to address the problems of enabling selective rewinding of an associated reel through a direct coupled ratcheting arrangement to permit rewinding of the reel only by the novel mechanism provided herein.

SUMMARY OF THE INVENTION

In view of the foregoing disadvantages inherent in the known types of motorized fishing reels now present in the prior art, the present invention provides a cordless electric fishing reel wherein the same utilizes an aligned plural contour gear arrangement for enhanced torque application to an associated reel directed through a ratchet coupling to permit one-way reeling of a fishing line upon selective actuation of a pivotal switch mounted within the handle of the rod and reel combination. As such, the general purpose of the present invention, which will be described subsequently in greater detail, is to provide a new and improved cordless electric fishing feel which has all the advantages of the prior art motorized fishing reels and none of the disadvantages.

To attain this, the present invention includes a fishing rod and reel combination wherein a gear drive fishing reel is associated by a ratchet coupling to a sleeved planetary gear arrangement wherein a dual planetary-sun gear mechanism provides enhanced torque application directed from an electric motor. An electric motor is selectively energized by utilizing a pivotal switch mounted within the handle to effect selective actuation of the reel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosed is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cordless electric fishing reel which has all the advantages of the prior art motorized fishing reels and none of the disadvantages.

It is another object of the present invention to provide a new and improved cordless electric fishing reel which may be easily and efficiently manufactured and marketed.

It is a further object of the present invention to provide a new and improved cordless electric fishing reel which is of a durable and reliable construction.

An even further object of the present invention is to provide a new and improved cordless electric fishing reel which is susceptible of a low cost of manufacture with regard to both materials and labor, and which accordingly is then susceptible of low prices of sale to the consuming public, thereby making such cordless electric fishing reel economically available to the buying public.

Still yet another object of the present invention is to provide a new and improved cordless electric fishing reel which provides in the apparatuses and methods of the prior art some of the advantages thereof, while simultaneously overcoming some of the disadvantages normally associated therewith.

Still another object of the present invention is to provide a new and improved cordless electric fishing reel wherein the same provides selective uni-directional actuation of an associated gear drive fishing reel in a winding operation provided through a ratchet coupling associating the electric motor and the fishing reel organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view taken in elevation of the organization of the instant invention.

FIG. 2 is an orthographic side view, somewhat enlarged, taken in elevation of the instant invention and its coupling with a gear driven reel.

FIG. 3 is an orthographic cross-sectional view illustrating the interior confines of the handle and the components directed therewith.

FIG. 4 is an orthographic plan view exploded for illustration of the various components of the instant invention.

DESCRIPTION OF THE PREFERRED EMBODIMENT

Figure 5:
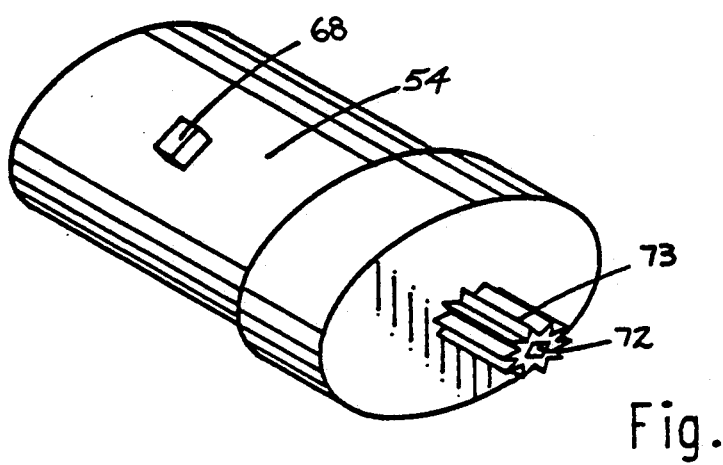
FIG. 5 is an isometric illustration of the electric motor of the instant invention.
Figure 6:
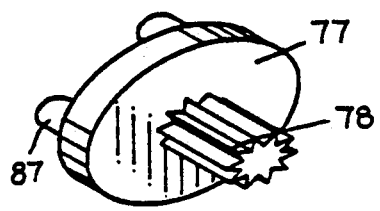
FIG. 6 is an isometric illustration of a unitary planetary gear arrangement of the instant invention.
Figure 8:
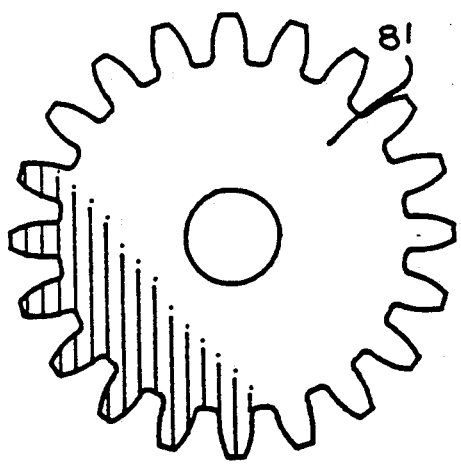
FIG. 8 is an orthographic view taken in elevation of the gear train including the planetary and sun gears of the instant invention.
Figure 7:
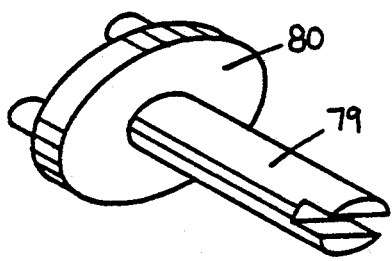
FIG. 7 is an isometric illustration of a unitary planetary gear arrangement including a planetary gear output shaft.

With reference now to the drawings, and in particular to FIGS. 1 to 12 thereof, a new and improved cordless electric fishing reel embodying the principles and concepts of the present invention and generally designated by the reference numeral 10 will be described.

More specifically, the cordless electric fishing reel 10 of the instant invention essentially comprises an elongate hollow handle 12 aligned with a support shank 14. The support shank 14 utilizes a securement fastener 16 cooperative with a threaded securement aperture 16a (see FIG. 3) to secure an associated reel within the shank 14. A collet 42 secures a flexible rod pole 44 to the shank 14 with fishing line 46 associated with the reel secured within the support shank 14.

A pivoted cover 18 utilizes a first spring-biased latch 20 and a release button 22 to selectively secure the pivoted cover 18 to the end of the elongate hollow handle 12. A switch lever 24 is pivotally mounted through the handle (see FIG. 10) and is pivoted about a pivot opening 24a within the handle. The reel utilizes a conventional reel face 30 with an internal gear drive "G" cooperative with an output shaft 60, to be described in more detail below, of the instant invention. A release lever 32 mounted within the reel housing side plates 40 releases the reel tension in a conventional manner, wherein the reel utilizes a housing 36 and a support shank 38 to secure the reel to the support shank 14 of the fishing rod organization. If desired, a reel crank arm 48 cooperative with a rotatable handle 52 aligned with a drag star wheel 50 may be utilized to manually retrieve and reel in the associated fishing line 46.

Figure 10:
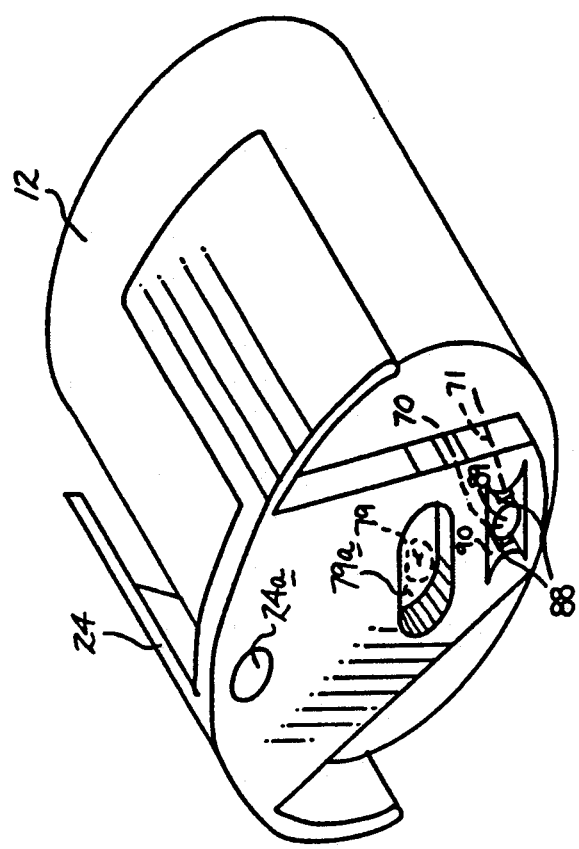
FIG. 10 is an isometric illustration of the swivel switch utilized by the instant invention.

An electric motor 54 (see FIGS. 3 and 4) includes an electric motor output shaft 72 that has secured thereto a first sun gear 73. A plurality of motor anchor legs 68 anchor the motor 54 within the hollow housing of the handle 12 and prevents relative rotation of the motor relative to the housing. A plurality of batteries "B" of conventional and commercially available construction are utilized to selectively actuate the electric motor 54. Respective first and second electric motor wires 70 and 71 associate the batteries "B" through the pivotal switch 24 with the motor 54. Attention to FIG. 10 illustrates the pivotal switch and the spaced pivotal ears of the pivot switch 24, wherein pivotment of the switch 24 about the pivot portion 24a selectively effects circuit completion of a central contact post 89 associated with a first electric motor wire 70 with a spring clip 88 preferably formed of stainless steel to minimize corrosion thereof in association with a second electrical motor wire 71, whereupon pivotment of the switch 24 effects contact and completion of a circuit with the central contact post 89 and a spring clip 88 mounted within the contact aperture 90. An output aperture 79a of an oval configuration allows free play of the output aperture about an associated planetary output shaft 79 (illustrated in phantom), wherein the output shaft 79, as illustrated in FIG. 4 for example, and is directed through the switch 24 to prevent hindrance of the output shaft 79 and free operation of the switch 24.

Figure 9:
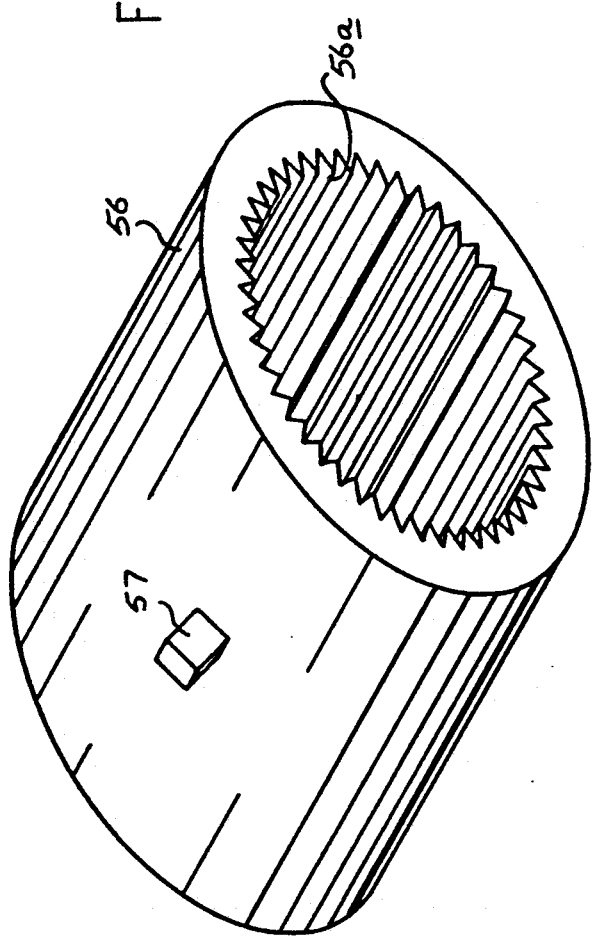
FIG. 9 is an isometric illustration of the planetary gear housing of the instant invention.
Figure 12:
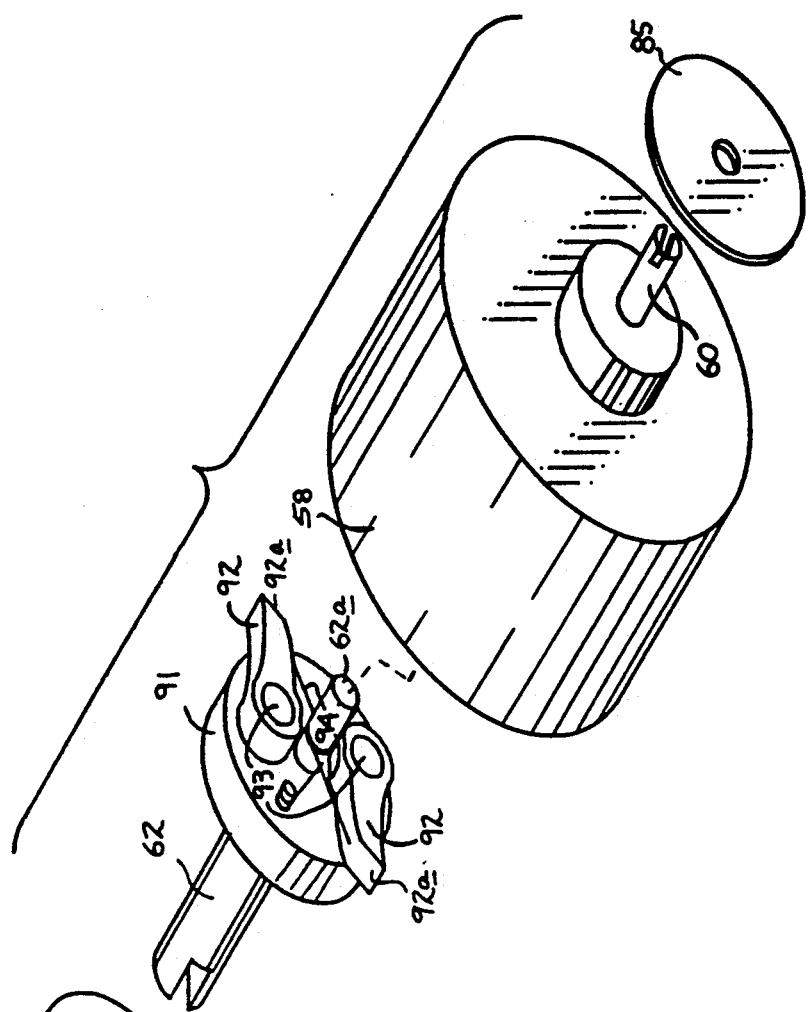
FIG. 12 is an isometric illustration of the ratchet coupling of the instant invention.
Figure 11:
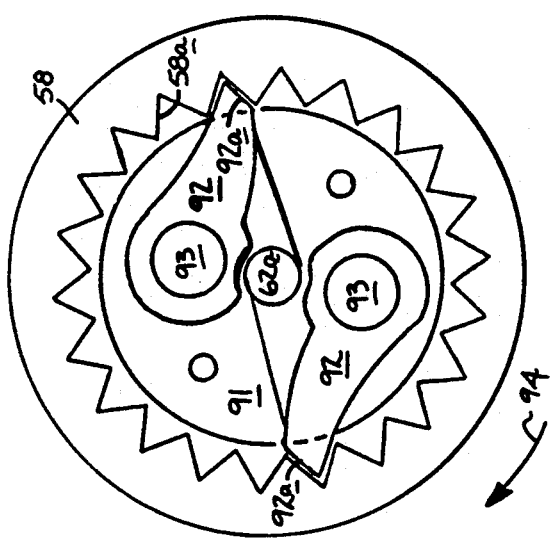
FIG. 11 is an orthographic cross-sectional view of the ratchet coupling utilized by the instant invention.

The first sun gear 73 cooperates with a trio of planetary gears defined specifically as first, second, and third planetary gears 74, 75, and 76 mounted to the first gear support plate 77. The gear support plate 77 mounts a second sun gear 78 coaxially thereof, whereupon rotation of the electric motor output shaft 72 effects rotation to the first, second, and third planetary gears 74, 75, and 76 and subsequent rotation of the second sun gear 78. The second sun gear 78 is coaxially mounted of first, second, and third second planetary gears 81, 82, and 83 mounted to a second gear support plate 80. A planetary output shaft 79 is coaxially mounted to the second gear output plate 80 wherein the planetary gears 74, 75, 76, and 81, 82, and 83 are mounted within the planetary gear housing 56 that is in turn fixedly mounted interiorly of the handle 12 coaxially aligned with the motor 54, whereupon utilization of the planetary gear housing legs 57 cooperate with a securement yoke 66 that secures the planetary gear housing legs 57 relative to the interior of the hollow handle 12. The planetary gear housing 56, as illustrated in FIG. 9, includes axially parallel and aligned planetary gear housing teeth 56a wherein the planetary gear housing teeth 56a cooperate with the aforenoted planetary gears to maintain them in an aligned and cooperative relationship with the motor 54 and the housing of the handle 12. The planetary output shaft 79 is directed through the planetary gear housing 56 and includes a bifurcated end portion 64 that cooperates with a ratchet drum input shaft 62. Reference to FIGS. 11 and 12 illustrate the ratchet drum 58 formed with a circumferentially and interiorly encompassing ratchet drum teeth 58a that cooperate with diametrically opposed pivot pawls. The pivot pawls 92 are mounted onto a ratchet pawl plate 91 aligned with and received interiorly of the ratchet drum 58. The diametrically opposed pawls 92 include beveled ends 92a, and wherein the pawls 92 are pivotal about pawl pivots 93 with spring elements 94 maintaining the pawls in an extended configuration, as illustrated in FIG. 11, cooperating with the ratchet drum teeth 58a. During a first rotation of the pawl plate input shaft 62a associated with the ratchet drum input shaft 62 effects a turning in a clockwise manner wherein the ratchet pawl plate 91 effects engagement with the pawls 92 in association with the ratchet drum 58 and thereby effect output rotatably through the ratchet drum output shaft 60, whereupon the double gear reduction to the plural sets of planetary teeth and associated sun gears directs the torque from the output shaft 60 to the gears "G" of the reel to effect a winding operation of the fishing line 46. To repeat, upon counter-clockwise rotation of the ratchet drum input shaft 62, the pawls 92 will slip relative to the ratchet drum teeth 58a disengaging torque application to the associated gearing "G" of the fishing reel. It is noted therefore that clockwise rotation of the ratchet drum input shaft 62 operatively couples the input shaft 62 to the ratchet drum 58 and thereby directs torque exteriorly thereof through the output shaft 60.

As required, spacer washers 85 provide appropriate clearance as desired and necessary to minimize binding and are generally associated with the ratchet drum input shaft 62 and the planetary output shaft 79. First and second respective gear plates 86 and 87 mount the associated second and third planetary gear sets 81, 82, 83 and 74, 75, and 76 respectively.

It may be appreciated therefore that pivotment of the switches 24 energizes the electrical motor 54 and through clockwise rotation only of the ratchet pawl plate 91 engages the ratchet pawl legs 92 with the associated ratchet drum 58 to effect the reeling or winding operation of the cordless electric fishing reel organization 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cordless electric fishing reel in combination with a fishing pole, the fishing pole including an elongate hollow handle in alignment with the fishing reel, and
   an electric motor mounted within the handle, and
   the fishing reel including rewind gearing coupled to an output shaft, the output shaft coaxially aligned with a ratchet means mounted in alignment with the reel for uni-directional rotative coupling of the output shaft with the electric motor, and
   switch means mounted on the handle for selective actuation of the electric motor, and
   including a battery pack mounted within the handle in electrical communication to the switch means and to the electric motor, and
   wherein a first sun gear is mounted to the electric motor, the first sun gear medially mounted to a series of first planetary gears, the first planetary gears coupled to a second sun gear, the second sun gear coupled medially to a second series of planetary gears, and the second planetary gears coupled to a planetary output shaft, wherein the planetary gear output shaft is coupled to the ratchet means, and
   wherein the ratchet means includes a ratchet input shaft integrally mounted to a ratchet support plate, the ratchet support plate including a plurality of pawl levers diametrically opposed relative to one another biased exteriorly of the ratchet support plate, and the pawls mounted interiorly of an internally geared ratchet drum, wherein a first rotation of the output shaft couples the output shaft to the planetary gear output shaft, wherein a second rotation in a reverse rotation relative to the first rotation disengages the planetary gear output shaft in association with the output shaft wherein the switch means includes a lever mounted orthogonally relative to the elongate hollow handle, and wherein the switch means includes an oval opening formed medially of the switch means for unobstructed reception of the planetary gear output shaft therethrough, wherein a lowermost end of the switch means includes a plurality of contacts for electrical association of the battery pack with the electric motor.

2. A cordless electric fishing reel as set forth in claim 1 wherein the planetary gear housing includes a plurality of legs mounted diametrically opposed relative to one another directed exteriorly of the planetary gear output housing and a yoke fixedly mounted relative to the housing coupled to the planetary gear housing legs for fixedly positioning the planetary gear housing relative to the handle.

3. A cordless electric fishing reel as set forth in claim 6 including a pivoted cover pivotally mounted to a remote end of the handle with a latch member selectively securing the cover to the handle to enable access to the battery pack therewithin.

* * * * *